United States Patent
Crawford et al.

[15] 3,644,237
[45] Feb. 22, 1972

[54] POLYURETHANE FOAM MATERIALS

[72] Inventors: Raymond V. Crawford, Liverpool; Gavin E. Roscoe, Formby, both of England

[73] Assignee: Bibby Chemicals Limited, Liverpool, England

[22] Filed: Feb. 26, 1969

[21] Appl. No.: 802,656

[30] Foreign Application Priority Data

Mar. 8, 1968 Great Britain ............... 11,324/68

[52] U.S. Cl. .......................... 260/2.5 AM, 260/18 TN
[51] Int. Cl. .......................... C08g 22/44, C08g 53/10
[58] Field of Search .................. 260/2.5 AM, 2.5 AN

[56] References Cited

UNITED STATES PATENTS

| | | | |
|---|---|---|---|
| 3,068,254 | 12/1962 | Le Bras et al. | 260/407 |
| 3,252,924 | 5/1966 | Merten et al. | 260/2.5 |
| 2,591,884 | 4/1952 | Simon et al. | 260/2.5 |
| 2,602,783 | 7/1952 | Simon et al. | 260/2.5 |
| 2,698,838 | 1/1955 | Simon et al. | 260/2.5 |
| 2,811,493 | 10/1957 | Simon et al. | 260/2.5 |

FOREIGN PATENTS OR APPLICATIONS

| | | | |
|---|---|---|---|
| 1,032,233 | 6/1966 | Great Britain | 260/2.5 |
| 1,032,365 | 6/1966 | Great Britain | 260/2.5 |
| 964,151 | 8/1964 | Great Britain | 260/2.5 UX |

*Primary Examiner*—Donald E. Czaja
*Assistant Examiner*—H. S. Cockeram
*Attorney*—Imirie, Smiley, Snyder and Butrum

[57] ABSTRACT

The invention is concerned with the production of polyurethane foams of the kind formed by reaction between a polyisocyanate (which term includes a di-isocyanate) and a glycol ester of a tribasic adduct obtained by reaction between a reactive dienophile e.g. maleic anhydride and an unsaturated fatty acid or ester. The process of the invention is directed to the production of polyurethane foams of that kind which are of finer cell structure and are less friable than previous foams of this kind by a more economic method which also avoids the distillation of unreacted acids from the tribasic adduct reaction product.

7 Claims, No Drawings

POLYURETHANE FOAM MATERIALS

In prior British Pat. No. 1,032,365 there has been described the production of polyurethane foams by the reaction between a di- or polyisocyanate and the glycol ester derived from reaction between a glycol and a tribasic adduct derived by combination of a reactive dienophile, e.g., maleic anhydride with an unsaturated fatty acid or ester. In this reaction unreacted unsaturated fatty acids were removed by distillation, a step which tends to increase the cost of the foamed materials. It has now been found that there is no need for the distillation step but the foam products so obtained tend to have a coarse cell structure and are rather friable.

It is an object of the present invention to avoid the disadvantages of the process referred to and to provide a polyurethane foam which is less friable, has a finer cell structure and is more economically produced by using mixtures of unsaturated fatty acids without distillation of any unreacted acids and using a limited amount of dienophilic dicarboxylic acid.

According to the invention there is provided a process for the production of polyurethane foam materials which comprises reacting a polyisocyanate (which term includes a di-isocyanate) with a polyol in the presence of a blowing agent, said polyol being formed by reaction between (A) unsaturated fatty acids or esters thereof and/or rosin acids, (B) a dienophilic dicarboxylic acid or anhydride or ester thereof and (C) a polyhydric alcohol, the ratio of component (B) to component (A) being from 1:16 to 1:30 by weight and the polyhydric alcohol being present in excess of the stoichiometric amount required to esterify the polybasic acid formed by reaction between components (A) and (B).

Component (A) may consist of the glycerides of the unsaturated fatty acids in the form of natural fats or the acids may be in the free state or as alkyl e.g., methyl, esters. Thus for example this component may comprise tall oil fatty acids or crude tall oil. The unsaturated fatty acid may however be replaced wholly or in part by rosin acids. A preferred mixture for the reaction with the dienophile is one consisting of tall oil fatty acids with a content of from 20–50 percent rosin acids. The content of unsaturated acid in component (A) should be at least 15 percent by weight.

Maleic anhydride is the preferred dienophilic dicarboxylic component, other examples of which are dimethyl maleate, itaconic acid or fumaric acid.

The polyhydric alcohol component (C) may be for example glycerol, trimethylol propane, hexane triols trimethylolethane, alkylolamines, e.g. diethanolamine or mixtures of polyhydric alcohols may be used, e.g. mixtures of glycerol and foam-forming polyether polyols.

In the process in accordance with the invention the reactants to form the polyol can generally be combined in any order, for example (i) all components can be reacted together, (ii) the polyhydric alcohol, e.g. glycerol, can be reacted with the unsaturated fatty acid before the dienophilic dicarboxylic component e.g. maleic anhydride is added, or (iii) the unsaturated fatty acid can be in the form of a triglyceride or monoglyceride to which the dienophile is added and further glycerol can be added later.

The glycerol or other polyhydric alcohol can be present in such excess that some of it is present in the free form in the polyol reaction product or an excess can be added to the reaction product before reaction with the di- or polyisocyanate. Such additions are made to increase the compressive strength of the foam obtained.

The amount of polyhydric alcohol used is such that the ratio of hydroxyl to carboxyl groups is sufficient to give a product with OH value in the region of 200–700 mg.KOH/g. In the case of the higher hydroxyl values, part of the polyhydric alcohol is present in the unesterified state. This excess can be present during the esterification reaction or added to the esterified product.

The addition of component (A) to component (B) may be carried out prior to the esterification step or concurrently. The temperature at which the addition is carried out may be between 160° and 320° C., preferably between 240°–300° C. The processing time for this reaction may be from one-half hour to 12 hours.

A further refinement in the preparation of the polyol comprises the inclusion of polybasic acids, e.g. polymeric fatty acids and low molecular weight dibasic acids, for example phthalic anhydride, adipic acid, glutaric acid and sebacic acid in the reaction. When polymeric fatty acids are included these will be added only after reaction between component (A) and component (B) has been completed, i.e., before or during reaction with component (C). A dialkanolamine, e.g., diethanolamine, may also be added at the end of the reaction or added during the reaction to give a clear product.

For the production of the polyurethane foam material there may be present, in addition to the blowing agent, catalysts, surfactants and fire-retardants. Examples of suitable blowing agents are water and low-boiling-point liquids, e.g. trichlorofluoromethane, methylene chloride, dichlorodifluoromethane.

Examples of suitable catalysts are tin compounds, triethylene diamine, triethylamine, dimethylethanolamine, or tetramethyl butane diamine.

Examples of suitable surfactants are silicone surfactants and nonionic wetting agents.

Examples of suitable fire-retardants are trichloroethyl phosphate, tris-(2,3-dibromo propyl)-phosphate, antimony compounds, ammonium salts and polyols containing combined phosphorus.

Examples of isocyanates which may be used in the production of the foam are toluene diisocyanate, diphenyl methane diisocyanate, or naphthalane diisocyanate in the crude or pure form.

The following Examples 1–12 illustrate typical preparations of a polyol used in the formation of polyurethane foam materials in accordance with the invention.

EXAMPLE 1

300 parts by weight of tall oil fatty acids containing 25 percent rosin acids and 15 parts by weight of maleic anhydride were heated for 3 hours at 290°–300° C. under atmospheric pressure and under a blanket of nitrogen. After cooling to 150° C., 122 parts of glycerol was added and the mixture was heated at 200° C. under atmospheric pressure for 2 hours during which time some water distilled out. At this stage the acid value was 40. The reaction mass was cooled to 120° C. and 32.5 parts diethanolamine was added with agitation.

The resultant product had an hydroxyl value of 458 mg.KOH/g.

EXAMPLE 2

300 parts by weight of tall oil acids containing 25 percent rosin acids and 18.7 parts maleic anhydride were heated together at 270°–280° C. for 3 hours. After cooling to 150° C., 123 parts of glycerol was added and the resultant mixture processed for 6½ hours at a temperature of 215° C. and then cooled to 120° C. and 15 parts of diethanolamine added.

The reaction product had an acid value of 15 mg.KOH/g. and hydroxyl value 413 mg.KOH/g.

EXAMPLE 3

The process was carried out as in Example 3 using tall oil acids containing 45 percent rosin acids but with esterification with glycerol at 220° C. for 5½ hours and omitting the diethanolamine.

The final acid value was 17 mg.KOH/g. and hydroxyl value 368 mg.KOH/g.

EXAMPLE 4

300 parts tall oil fatty acids containing 25 percent rosin acids and 18.7 parts maleic anhydride were heated together as in Example 3 after which 149 parts glycerol and 32 parts phthalic anhydride were added. The reactants were heated to a temperature of 225° C., over 4 hours after which time the acid value was 14 mg.KOH/g. and the hydroxyl value 324 mg.KOH/g.

EXAMPLE 5

The process was carried out as in Example 5 except that 165 parts of trimethylolpropane instead of glycerol was added to the tall oil/maleic anhydride adduct and the esterification step carried out for 11½ hours at a maximum temperature of 230° C.

The final constants were acid value 29 mg.KOH/g. and hydroxyl value 328 mg.KOH/g.

added. The resultant mixture was processed for 2½ hours with a maximum temperature of 230° C. The reaction product had an acid value of 4.4 mg.KOH/g. and a hydroxyl value of 345 mg.KOH/g.

EXAMPLE 10

350 parts of water white rosin and 21.9 parts by weight maleic anhydride were heated together for 1 hour at 270°–280° C. The product was then esterified with 143 parts glycerol for 3 hours at 230° C. and 25 parts triethanolamine was added, after cooling to 120° C., to give a product of acid value, 5.2 mg.KOH/g. and hydroxyl value, 370 mg.KOH/g.

TABLE A.—THE POLYESTERS PREPARED AS IN EXAMPLES 1–10 WERE USED IN MAKING RIGID POLYURETHANE FOAMS AS SHOWN BELOW

| Polyol from Example | A 1 | C 3 | D 4 | E 5 | F 6 | G 3 | H 3 | J 7 | K 8 | L 9 | M 10 | N 11 |
|---|---|---|---|---|---|---|---|---|---|---|---|---|
| Formulation of foam component 1: | | | | | | | | | | | | |
| Polyester | 37.6 | 46.4 | 57.2 | 35.6 | 50.1 | 57.2 | 49.0 | 50.0 | 46.0 | 31.2 | 46.4 | 46.4 |
| Glycerol | 1.4 | 4.5 | 5.8 | 3.5 | 9.2 | 8.2 | | 9.2 | 4.5 | 3.1 | 4.5 | 4.5 |
| "Voranol" CP260 | 35.6 | 24.1 | 11.7 | 35.6 | 6.2 | | | 6.2 | 24.1 | 31.0 | 24.1 | 24.1 |
| NC 1049 [1] | | | | | 9.5 | | | | | | | |
| Water | 0.4 | 0.4 | 0.4 | 0.4 | 0.4 | 0.5 | 0.4 | 0.4 | 0.35 | 0.4 | 0.4 | |
| SF1066 [2] | 0.8 | 0.4 | 0.4 | 0.4 | 0.35 | 0.4 | | 0.4 | 0.4 | 0.35 | 0.4 | 0.4 |
| D.M.E.A | 1.4 | 1.4 | 1.3 | 1.4 | 1.3 | 0.7 | 1.3 | 1.4 | 1.4 | 1.4 | 1.4 | |
| T.C.E.P | 14.2 | 14.2 | 14.2 | 14.2 | 12.5 | 14.2 | | 12.5 | 14.2 | 12.4 | 14.2 | 14.2 |
| T.C.F.M | 23.1 | 23.1 | 23.1 | 23.1 | 23.0 | 23.1 | | 23.0 | 23.1 | 20.2 | 23.1 | 23.1 |
| Ratio of component 1 to "Desmodur" 44V (diphenyl methane diisocyanate (crude)) | 1:1 | 1:1 | 1:1 | 1:1 | 1:1 | 1:1 | 1:1 | 1:1 | 1:1 | 1:1 | 1:1 | 1:1 |
| Cream time (sec.) | 40 | 31 | 31 | 45 | 32 | 25 | 48 | 31 | 30 | 18 | 29 | 28 |
| Rise time (sec.) | 225 | 185 | 185 | 240 | 123 | 140 | | 175 | 145 | 120 | 162 | 165 |
| Density (lb./cu. ft.) | 2.4 | 2.4 | 2.4 | 3.0 | 2.2 | 2.3 | 9.4 | 2.1 | 3.0 | 2.2 | 2.5 | 3.0 |
| Compressive strength (lb./sq. in.) | | 39 | 39 | 44 | 33 | 30 | | | | | | |

[1] "Voranol" CP260 and NC1049 and polyether polyols made by Dow Chemical Company. "Voranol" CP-260 is prepared by the reaction of glycerine and propylene oxide. "Voranol" NC-1049, which is also known as "Voranol" SA-1049, is a polyether octol derived from sucrose, and contains about 12% OH.
[2] SF1066 is a silicone surfactant made by General Electric Company. It is a copolymer of a dimethylpolysiloxane and a polyoxyalkylene ether.

NOTES.—In the above Table A the figures given for the formulation of component 1 and the ratio of component 1 to "Desmodur" 44V are parts by weight.
"Desmodur" and "Voranol" are registered trademarks.
"Desmodur 44V" is basically diphenylenemethane-4,4'-di-isocyanate, and is described in the Bayer Pocket Book for the Plastic Industry, 3rd Edition, 1963, page 47, published by Farbenfabriken Bayer, A.G.
D.M.E.A. is dimethylethanolamine.
T.C.E.P. is trichloroethyl phosphate.
T.C.F.M. is trichlorofluoromethane.

EXAMPLE 6

The process was carried out as in Example 5 but instead of glycerol and phthalic anhydride, 326 parts 3-methylol, 2,4-pentane diol and 30.6 parts adipic, glutaric and succinic acid mixture as in Example 2 were added to the tall oil/maleic anhydride adduct. The mixture was then processed for 7 hours at a maximum temperature of 215° C.

The product had an acid value 27.5 mg.KOH/g. and hydroxyl value 300 mg.KOH/g.

EXAMPLE 7

640 parts crude lard and 40 parts maleic anhydride were heated together at atmospheric pressure for 3 hours at 280°–300° C., cooled to 150° C. and 178 parts glycerol and 0.07 parts litharge were added. The mixture was then processed at 210°–220° C. until a 1:1 mixture with methanol produced a clear solution.

The product had an acid value 3.7 mg.KOH/g. and hydroxyl value 350 mg.KOH/g.

EXAMPLE 8

840 parts crude lard and 40 parts maleic anhydride were heated together at atmospheric pressure for 3 hours at 280°–300° C., cooled to 150° C. and 220 parts glycerol and 0.07 parts litharge were added. The mixture was then processed at 220°–225° C. until a 1:1 mixture with methanol produced a clear solution. After cooling to 120° C., 40 g. diethanolamine was added to give a product with an acid value 5.3 mg.KOH/g. and a hydroxyl value 365 mg.KOH/g.

EXAMPLE 9

640 parts of acidified sunflower oil foots and 40 parts by weight maleic anhydride were heated together as in EXAMPLE 3, at the end of which time 200 parts of glycerol were

We claim:
1. A polyurethane foam made by the process which comprises reacting an organic polyisocyanate with a polyol in the presence of a blowing agent, the said polyol having a hydroxyl number of 200 to 700 and being formed by reaction between (A) a substance selected from the group consisting of unsaturated fatty acids, unsaturated fatty acid esters, and rosin acids, the content of unsaturated acid in this component being at least 15 percent by weight, (B) a substance selected from the group consisting of dienophilic dicarboxylic acids, their esters and their anhydrides and (C) a polyhydric alcohol, the ratio of component (B) to component (A) being from 1:16 to 1:30 by weight and the polyhydric alcohol being present in excess of the stoichiometric amount required to esterify the polybasic acid formed by reaction between component (A) and component (B).

2. The polyurethane foam of claim 1 wherein low molecular weight dibasic acids are also included in the reaction components for forming the polyol.

3. The polyurethane foam of claim 1 wherein polymerized fatty acids are added to the reaction components forming the polyol after reaction between component (A) and component (B) has been completed.

4. The polyurethane foam of claim 1 wherein a dialkanolamine is added to the reaction components forming the polyol at any time up to and including the end of the polyol-forming reaction.

5. The polyurethane foam of claim 1 wherein during the reaction between the polyol and the organic polyisocyanate, catalysts surfactants and fire-retardants are present.

6. The polyurethane foam of claim 1 wherein a polyhydric alcohol is added to the polyol reaction product before the polyol is reacted with the organic polyisocyanate.

7. The polyurethane foam of claim 1 wherein component (A) comprises a mixture of 80 to 50 percent by weight of tall oil fatty acids and 20 to 50 percent by weight of rosin acids.

* * * * *